C. E. LORD.
MOTOR CONTROLLER.
APPLICATION FILED OCT. 25, 1909.

998,361.

Patented July 18, 1911.
2 SHEETS—SHEET 1.

Witnesses
John L. Johnson
Chas. L. Byron

Inventor
Chas. E. Lord

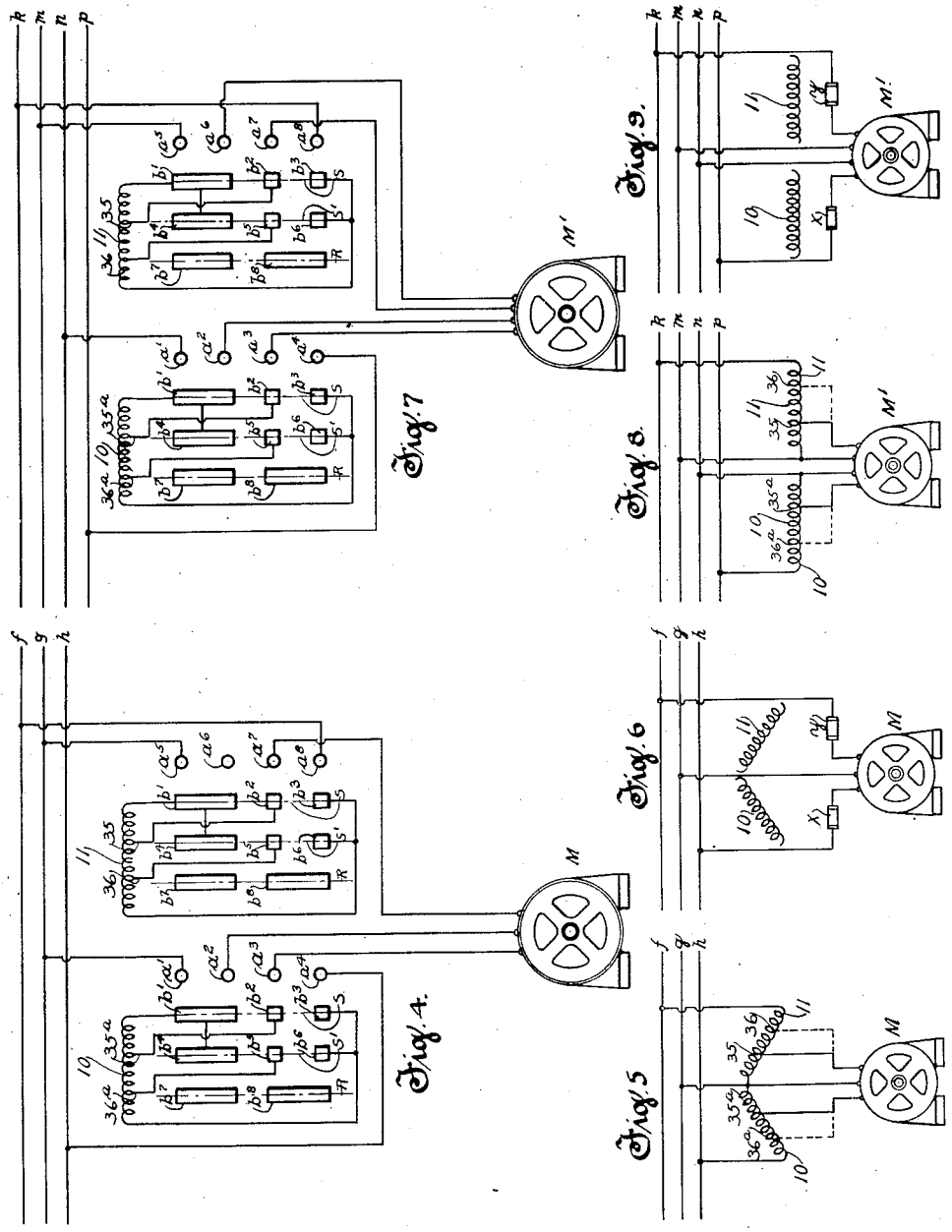

UNITED STATES PATENT OFFICE.

CHARLES E. LORD, OF MILWAUKEE, WISCONSIN, ASSIGNOR TO ALLIS-CHALMERS COMPANY, A CORPORATION OF NEW JERSEY.

MOTOR-CONTROLLER.

998,361.

Specification of Letters Patent.   Patented July 18, 1911.

Application filed October 25, 1909.   Serial No. 524,390.

*To all whom it may concern:*

Be it known that I, CHARLES E. LORD, a citizen of the United States, residing at Milwaukee, in the county of Milwaukee and State of Wisconsin, have invented certain new and useful Improvements in Motor-Controllers, of which the following is a full, clear, and exact specification.

My present invention relates to starting devices for alternating current motors, and more particularly to devices for starting polyphase motors of the induction type by varying the potential impressed upon the primary windings of the motor.

The object of the invention is to simplify the construction and arrangement of a potential starter, and to increase its efficiency and effectiveness in operation, while at the same time permitting its use in two-phase and three-phase systems of distribution without change in its construction and without substitution of parts.

The invention therefore consists in improvements in a system of control for alternating current motors and also improvements in the construction and arrangement of parts of potential starters which shall be described in the specification and more particularly pointed out in the appended claims.

Figure 1:
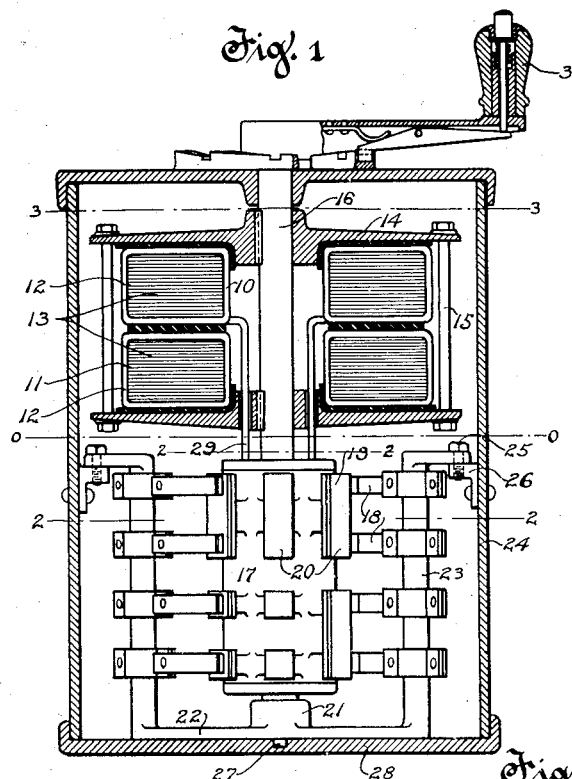
Figure 2:
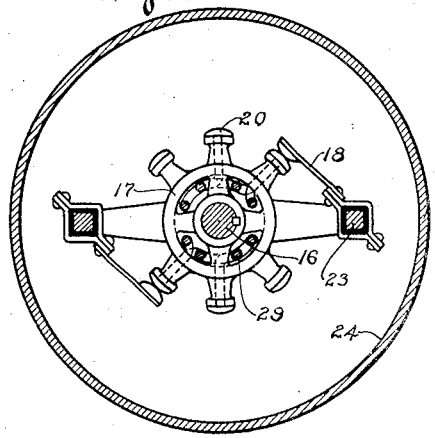
Figure 3:
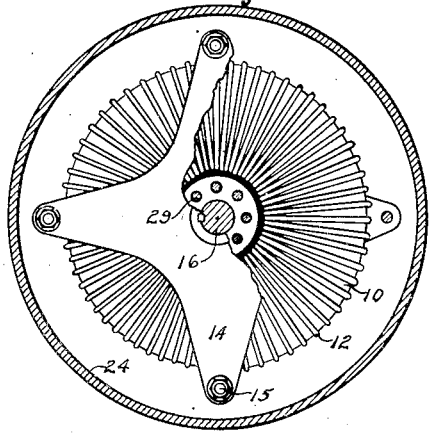

In the accompanying sheet of drawings, Figure 1 is a longitudinal elevation, partly in section, of a starting device embodying my invention; Fig. 2 is a view taken along the line 2—2 of Fig. 1; Fig. 3 is a view taken along the line 3—3 of Fig. 1; Fig. 4 is a diagrammatic representation of my improved potential starter used in connection with a three-phase system; Figs. 5 and 6 are diagrams of the connections made by the starter in Fig. 4 in the starting and running positions, respectively; Fig. 7 is a diagrammatic representation of the starter used in connection with a two-phase system; and Figs. 8 and 9 are diagrams of the connections made by the starter in Fig. 7 in the starting and running positions, respectively.

Two single coil transformers 10 and 11, each consisting of windings 12 and cores 13, are mounted in a frame 14. This frame 14 is held together by means of bolts 15 and is mounted on a shaft 16. Mounted on this shaft and preferably below the transformer is the drum 17 of a controlling switch 19. This switch comprises contact fingers 18 and the drum 17 carrying contact segments 20. The transformers 10 and 11 and drum 17 are fixed on the rotatable shaft 16, the lower part of which fits into a bored portion of the lug 21. This lug forms part of a framework 22 which is provided with vertical supports 23, which are fastened to the casing 24 of the controller by means of bolts 25 passing through the upper part of said supports and engaging a threaded portion of the brackets 26. The frame work 22 is provided with a small projection 27 which engages a bored portion in the base 28 of the controller casing. By means of this arrangement and also of the screws 25 engaging the brackets 26, the frame-work 22 is centered and retained in its proper position.

Mounted upon and insulated from the supporting members 23 are the contact fingers 18 which are adapted to co-act with the contact segments 20 in a manner to be hereinafter described. These contact fingers are connected with motor terminals and transformer terminals and taps from said transformers by leads 29, only parts of which are shown in Fig. 1, the most of said leads being omitted for the sake of clearness of illustration. The shaft 16 is provided with an operating handle 30 for turning the controlling switch into the off, starting and running positions respectively. As the handle 30 is moved in a clock-wise direction from the off position it reaches a starting position. A further movement in the same direction brings the drum into a running position. A further movement in the same direction brings the drum again into its off position, 180° removed from its initial position. A further movement of 180° in the same direction will move the drum again through starting and running positions and said drum will be turned to its initial off position. To accomplish the controlling operation by 180° movement of the drum and operating handle, the contact fingers are mounted on both sides of the vertical drum and arranged with contact segments on opposite sides of said drum in exact duplicate. Mechanism for the controlling operation and for constraining the operating shaft to move always in one direction in operating the potential starter from the running position is described and claimed in Patent 909,367 to Cheney.

The controller drum and contact fingers are preferably arranged to operate in an oil bath and for this purpose the controller casing 24 is made for containing oil. The casing contains oil up to the level indicated by the line O—O of Fig. 1, the drum being completely immersed in the oil. If desired, however, both the transformer and drum could be immersed in oil.

By referring to Figs. 4 and 7, it will be seen that the controller drum (here shown in development) is provided with two duplicate sets of straight bridging contact segments, $b^1$, $b^2$, $b^3$, $b^4$, $b^5$, $b^6$, $b^7$, and $b^8$, the segments $b^1$, $b^2$ and $b^3$ of each set corresponding to a starting position indicated by the vertical lines S, and the segments $b^4$, $b^5$, and $b^6$ corresponding to a second starting position indicated by the vertical lines $S^1$, and segments $b^7$ and $b^8$ of each set corresponding to the running position indicated by lines R. These segments coöperate with contact fingers $a^1$ to $a^8$ inclusive in various operative positions of the controlling switch. The controlling switch in Fig. 4 is arranged to connect the transformers 10 and 11 and three-phase motor M to the supply mains $f$, $g$, and $h$ of a three-phase system of distribution. The controlling switch in Fig. 7 is arranged to connect the transformers 10 and 11 and the two phase motors $M^1$ to the mains $k$, $m$, $n$, and $p$ of a two-phase system of distribution. In either case the transformers 10 and 11 are the same and the taps are brought off at intermediate points 35, 36, $35^a$ and $36^a$. The controller drums and fingers are also the same in each case. The only thing necessary to adapt the controller to a three-phase or a two-phase system is to change the leads with a few of the contact fingers, as may be clearly seen by inspection of Figs. 4 and 7. The finger $a^6$ is not employed in the three-phase connections.

When the controlling switch shown in Fig. 4 is moved to its first starting position S, the segments $b^1$, $b^2$, $b^3$ of one set are in engagement with the fingers $a^1$, $a^2$, $a^3$, and $a^4$, and the corresponding segments of the other set are in engagement with the fingers $a^5$, $a^7$, and $a^8$. This results in the connections clearly shown in Fig. 5, the transformer coils being V connected, or connected in open delta, across the three-phase mains $f$, $g$, and $h$, and the motor M connected to the taps 35 and $35^a$ and the apex of the V formed by the transformers. A potential lower than the potential of the mains is thus impressed upon the primary winding of the motor and the same starts with considerable torque and a reduced flow of current in the secondary windings. When the controlling switch is moved into the second starting position $S^1$ the segments $b^4$, $b^5$, and $b^6$ of one set are in engagement with fingers $a^1$, $a^2$, $a^3$ and $a^4$, and the segments $b^4$, $b^5$, $b^6$ of the other set are in engagement with contact fingers $a^5$, $a^7$, and $a^8$, giving the connections shown in Fig. 5, the motor terminals being connected to taps 36 and $36^a$, as indicated by dotted lines. When the controlling switch is moved to the running position R, the segments $b^7$, and $b^8$ of one set are in engagement with fingers $a^1$, $a^2$, $a^3$, and $a^4$, and the segments $b^7$ and $b^8$ of the other set are in engagement with the contact fingers $a^5$, $a^7$, and $a^8$, giving the connections shown in Fig. 6. In this running position the transformer coils are completely cut out of circuit and the motor is directly connected to the mains $f$, $g$, and $h$, thereby impressing the potential of the mains upon the motor primary winding and increasing the speed of the motor. In passing to this position, protective devices or fuses $x$ and $y$ are connected in circuit to protect the motor against injury due to overload and excess of current.

The connections made by the controlling switch in Fig. 7 may be traced readily on the diagram, the starting positions giving the connections shown in Fig. 8 in which transformer 10 is connected across one phase $n\ p$ of the two-phase system and the other transformer 11 is connected across the other phase $k\ m$, one phase of the motor winding being connected between the taps $36^a$ or $35^a$, and one end of the transformer 10, and the other phase of the motor being connected between the taps 35 or 36 and one end of transformer 11. In the running position the transformer coils are cut out of circuit and the motor is connected directly to the supply mains $k$, $m$, $n$ and $p$, as shown in Fig. 9 and the fuses are connected in circuit.

It is evident that the compact arrangement of having the transformers and controlling drum mounted on the same movable support is advantageous and provides a simple manner in which the use of a plurality of operating shafts and gearing between the same may be obviated.

In the appended claims, I aim to cover all modifications of my invention which do not involve a departure from its spirit and scope.

What I claim as new is:

1. A controller for use in electric circuits comprising a transformer surrounding and mounted on a movable support, a drum mounted on said movable support independently of said transformer and having contact segments connected to different points of the winding of said transformer, and contact fingers adapted to engage said contact segments.

2. In a motor controller, a shaft, a transformer having a circular core surrounding and mounted on said shaft and a transformer winding having a plurality of taps and also surrounding said shaft, and a drum on said shaft mounted independently of said transformer, said drum having contact segments connected to said taps.

3. In combination, mains of a three-phase system of distribution, a three-phase motor, two single coil transformers provided with a rotatable support and connected in open delta across said mains, a tap from an intermediate point of each of said transformers, and a potential starter provided with a drum having contact segments and mounted on said transformer support, contact members coöperating with said segments so that when the starter is in one position it connects the motor with said taps and the mains to which both the coils of said transformer are connected, and in another position connects said motor directly to said mains.

4. In combination, mains of a three-phase system of distribution, a three-phase motor, two single coil transformers provided with a rotatable support and connected in open delta across the mains, a tap from an intermediate point of each of said transformers, a potential starter provided with a drum having contact segments and mounted on said support, contact members coöperating with said segments so that when the starter is in one position it connects the motor to said taps and the mains with which both the coils of said transformers are connected, and in another position connects said motor directly to said mains, and overload protective devices for said motor which are automatically connected in circuit when the controller is moved into said other position and are cut out of circuit in all other positions.

5. In a potential starter, a shaft, transformers mounted on said shaft, a controlling switch comprising a contact carrying drum mounted on said shaft independently of said transformer and co-acting fingers fixed exterior to said drum, contacts of said controlling switch being so arranged that as the drum is moved forward through 180 degrees the controlling switch passes successively into the "starting", "running", and the "off" positions.

6. In a potential starter, a shaft, a transformer mounted on said shaft, a controlling drum mounted on said shaft and being provided with duplicate sets of contact segments in a starting position, and other duplicate sets of contact segments in running position.

7. In a potential starter, the combination with two sets of contact fingers, a rotatable transformer and rotatable drum mounted on the same support, the drum having duplicate rows of starting contacts and duplicate rows of running contacts, and being movable to bring the rows of starting or running contacts into simultaneous engagement with said sets of contact fingers, any row of contacts being arranged to coöperate with either set of contact fingers.

Milwaukee, Wisconsin, October 14, 1909.

In testimony whereof I affix my signature, in the presence of two witnesses.

CHARLES E. LORD.

Witnesses:
CHAS. L. BYRON,
ROB. E. STALL.

---

It is hereby certified that in Letters Patent No. 998,361, granted July 18, 1911, upon the application of Charles E. Lord, of Milwaukee, Wisconsin, for an improvement in "Motor-Controllers," an error appears in the printed specification requiring correction as follows: Page 2, line 17, the reference-letter "$b^5$" second occurrence should read $b^6$; and that the said Letters Patent should be read with this correction therein that the same may conform to the record of the case in the Patent Office.

Signed and sealed this 17th day of October, A. D., 1911.

[SEAL.]

C. C. BILLINGS,

*Acting Commissioner of Patents.*